United States Patent

Cane et al.

Patent Number: 5,384,053
Date of Patent: Jan. 24, 1995

[54] PRODUCTION OF A LUBRICATING OIL ADDITIVE CONCENTRATE

[75] Inventors: Charles Cane, Hull; John Crawford, Surrey; Sean P. O'Connor, Hull, all of England

[73] Assignee: BP Chemicals (Additives) Limited, London, England

[21] Appl. No.: 202,665

[22] Filed: Feb. 25, 1994

Related U.S. Application Data

[63] Continuation of Ser. No. 8,392, Jan. 25, 1993, abandoned, which is a continuation of Ser. No. 879,541, May 4, 1992, abandoned, which is a continuation of Ser. No. 363,546, Jun. 8, 1989, abandoned.

[30] Foreign Application Priority Data

Jun. 4, 1988 [GB] United Kingdom ............ 88/14012

[51] Int. Cl.⁶ .......................................... C10M 159/24
[52] U.S. Cl. ....................................... 252/18; 252/33.2
[58] Field of Search .................................. 252/18, 33.2

[56] References Cited

U.S. PATENT DOCUMENTS

| | | | |
|---|---|---|---|
| 3,256,186 | 6/1966 | Greenwald | 252/33 |
| 3,539,511 | 11/1970 | Sabol et al. | 252/33 |
| 3,544,463 | 12/1970 | Koft, Jr. | 252/33 |
| 3,671,430 | 6/1972 | Corringer | 252/33 |
| 3,766,066 | 10/1973 | McMillen | 252/33 |
| 4,171,269 | 10/1979 | Sung et al. | 252/33 |
| 4,328,111 | 5/1982 | Watson et al. | 252/33.4 |
| 4,598,026 | 7/1986 | Vinci | 252/33 |
| 4,698,170 | 10/1987 | Le Coent | 252/33.2 |
| 4,744,921 | 5/1988 | Liston | 252/421 |
| 4,758,360 | 7/1988 | Bernasconi et al. | 252/33 |
| 4,764,295 | 8/1988 | Le Coent | 252/332 |
| 4,879,053 | 11/1989 | Matthews et al. | 252/33 |
| 5,162,085 | 11/1992 | Cane et al. | 252/18 |

FOREIGN PATENT DOCUMENTS

| | | |
|---|---|---|
| 1309172 | 3/1973 | European Pat. Off. |
| 0095322 | 11/1983 | European Pat. Off. ... C10M 159/22 |
| 1038263 | 8/1966 | United Kingdom . |
| 1139172 | 1/1969 | United Kingdom . |
| 1483460 | 8/1977 | United Kingdom . |
| 2037309 | 7/1980 | United Kingdom . |
| 2037310 | 7/1980 | United Kingdom . |
| 2181149 | 4/1987 | United Kingdom . |
| 8803944 | 6/1988 | WIPO . |
| 8808945 | 6/1988 | |

Primary Examiner—Jerry D. Johnson
Attorney, Agent, or Firm—Brooks Haidt Haffner & Delahunty

[57] ABSTRACT

A process for the production of a lubricating oil additive concentrate comprises reacting at elevated temperature
component (A) a calcium hydrocarbyl-substituted sulphonate,
component (B) an alkaline earth metal base added either in a single addition or in a plurality of additions at intermediate points during the reaction,
component (C) at least one compound which is (i) a polyhydric alcohol having 2 to 4 carbon atoms, (ii) a di- ($C_3$ or $C_4$) glycol, (iii) a tri- ($C_2$–$C_4$) glycol, (iv) a mono- or poly-alkylene glycol alkyl ether of the formula (I)

$$R(OR^1)_xOR^2 \qquad (I)$$

wherein R is a $C_1$ to $C_6$ alkyl group, $R^1$ is an alkylene group, $R^2$ is hydrogen or a $C_1$ to $C_6$ alkyl group and x is an integer from 1 to 6, (v) a $C_1$ to $C_{20}$ monohydric alcohol, (vi) a $C_1$ to $C_{20}$ ketone, (vii) a $C_1$ to $C_{10}$ carboxylic acid ester, or (viii) a $C_1$ to $C_{20}$ ether,
component (D) a lubricating oil,
component (E) carbon dioxide added subsequent to the, or each, addition of component (B),
component (F) a defined carboxylic acid or derivative, component (G) at least one compound which is (i) an inorganic halide or (ii) an ammonium alkanoate or a mono-, di-, tri-, or tetra-alkyl ammonium formate or alkanoate provided that, when component (G) is (it), component (F) is not an acid chloride.

6 Claims, No Drawings

PRODUCTION OF A LUBRICATING OIL ADDITIVE CONCENTRATE

This application is a continuation of application Ser. No. 08/008,392, filed Jan. 25, 1993, now abandoned; which is a continuation of Ser. No. 07/879,541, filed May 4, 1992, now abandoned; which is a continuation of Ser. No. 07/363,546, filed Jun. 8, 1989, now abandoned.

The present invention relates to a process for the production of, and compositions comprising, a lubricating oil additive concentrate containing alkaline earth metal hydrocarbyl-substituted sulphonates.

In the internal combustion engine, by-products from the combustion chamber often blow by the piston and admix with the lubricating oil. Many of these by-products form acidic materials within the lubricating oil.

One class of compounds generally employed to neutralise the acidic materials and disperse sludge within the lubricating oil are the metal hydrocarbyl-substituted sulphonates wherein the metal is an alkaline earth metal such as calcium, magnesium or barium. Both "normal" and "overbased" alkaline earth metal hydrocarbyl-substituted sulphonates have been employed. The term "overbased" is used to describe those alkaline earth metal hydrocarbyl-substituted sulphonates in which the ratio of the number of equivalents of the alkaline earth metal moiety to the number of equivalents of the sulphonate moiety is greater than one, and is usually greater than 1.2 and may be as high as 4.5 or greater. In contrast the equivalent ratio of alkaline earth metal moiety to sulphonate moiety in "normal" alkaline earth metal hydrocarbyl-substituted sulphonates is one. Thus, the "overbased" material usually contains greater than 20% in excess of the alkaline earth metal than present in the corresponding "normal" material.

For this reason "overbased" alkaline earth metal hydrocarbyl-substituted sulphonates have a greater capability for neutralising acidic matter than do the corresponding "normal" alkaline earth metal hydrocarbyl-substituted sulphonates.

The prior art teaches many methods for preparing both "normal" and "overbased" metal hydrocarbyl-substituted sulphonates.

GB1,139,172 discloses lubricant additives which comprise an oil solution of an alkaline earth metal sulphonate/carbonate complex prepared by the action of carbon dioxide on an oil solution of an alkaline earth metal sulphonate containing an alkaline earth metal base in the presence of 2–10% by weight of the oil of an ammonium salt or an alkaline earth metal halide and as a stabiliser 3–20% of a polyalkenyl succinic anhydride or an alkaline earth metal salt or ester thereof.

We have now found an improved process for the production of overbased alkaline earth metal hydrocarbyl-substituted sulphonates.

Accordingly, the present invention provides a process for the production of a lubricating oil additive concentrate which comprises reacting at elevated temperature, component (A) a calcium hydrocarbyl-substituted sulphonate,
component (B) an alkaline earth metal base added either in a single addition or in a plurality of additions at intermediate points during the reaction,
component (C) at least one compound which is (i) a polyhydric alcohol having 2 to 4 carbon atoms, (ii) a di- ($C_3$ or $C_4$) glycol, (iii) a tri ($C_2$–$C_4$) glycol, (iv) a mono- or poly-alkylene glycol alkyl ether of the formula (I)

$$R(OR^1)_xOR^2 \qquad (I)$$

wherein R is a $C_1$ to $C_6$ alkyl group, $R^1$ is an alkylene group, $R^2$ is hydrogen or a $C_1$ to $C_6$ alkyl group and x is an integer from 1 to 6, (v) a $C_1$ to $C_{20}$ monohydric alcohol, (vi) a $C_1$ to $C_{20}$ ketone, (vii) a $C_1$ to $C_{10}$ carboxylic acid ester, or (viii) a $C_1$ to $C_{20}$ ether,
component (D) a lubricating oil,
component (E) carbon dioxide added subsequent to the, or each, addition of component (B),
component (F) sufficient to provide from 2 to 40% by weight, based on the weight of the concentrate, of a carboxylic acid or an acid anhydride, acid chloride or ester thereof, said acid having the formula (II) and having a molecular weight of less than 500

$$R^3-\underset{R^4}{\underset{|}{CH}}-COOH \qquad (II)$$

wherein $R^3$ is a $C_{10}$ to $C_{24}$ alkyl or alkenyl group and $R^4$ is hydrogen, a $C_1$ to $C_4$ alkyl group or a $CH_2COOH$ group, and
component (G) at least one compound which is (i) an inorganic halide or (ii) an ammonium alkanoate or a mono-, di-, tri- or tetra-alkyl ammonium formate or alkanoate provided that when component (G) is (ii), component (F) is not an acid chloride.

Component (A) is a calcium hydrocarbyl-substituted sulphonate;

this may be prepared by any of the variety of means known in the art.

The hydrocarbyl substituent of the hydrocarbyl-substituted sulphonate may contain up to 125 aliphatic carbon atoms. Examples of suitable substituents include alkyl radicals, for example hexyl, cyclohexyl, octyl, isooctyl, decyl, tridecyl, hexadecyl, eicosyl and tricosyl, radicals derived from the polymerisation of both terminal and internal olefins, for example ethene, propene, 1-butene, isobutene, 1-hexene, 1-octene, 2-butene, 2-pentene, 3-pentene and 4-octene. Preferably the hydrocarbyl substituent is one derived from a monoolefin, more preferably from a monoolefin which is either propene, 1-butene or isobutene.

The alkaline earth metal base (component B) may suitably be an alkaline earth metal oxide or hydroxide, preferably the hydroxide. Calcium may be added for example in the form of quick lime (CaO) or in the form of slaked lime ($Ca(OH)_2$). Preferred alkaline earth metals are calcium, magnesium, strontium and barium, preferably calcium. The alkaline earth metal base is preferably added in an amount relative to component (A) sufficient to produce a product having a TBN in excess of 300, more preferably in excess of 350. This amount will depend on a number of factors including the nature of the hydrocarbyl-substituent and will be higher than the amounts generally employed in prior art processes. Typically, the weight ratio of component (B) to component (A) may suitably be in the range from 0.2 to 50, preferably from 0.4 to 10.

Component (B) may be added in whole to the initial reactants, or in part to the initial reactants and the remainder in one or more portions at a subsequent stage or stages in the process. It is preferred that component (B) is added in a single addition.

As component (C) there may be used one or more polar organic compounds or mixtures thereof.

Suitable compounds having the formula (I) include the monomethyl or dimethyl ethers of (a) ethylene glycol, (b) diethylene glycol, (c) triethylene glycol or (d) tetraethylene glycol. A particularly suitable compound is methyl diglycol ($CH_3OCH_2CH_2OCH_2CH_2OH$). Mixtures of glycol ethers of formula (I) and glycols may also be employed. The polyhydric alcohol may suitably be either a dihydric alcohol, for example glycerol. The di- ($C_3$ or $C_4$) glycol may suitably be dipropylene glycol, the tri- ($C_2$ to $C_4$) glycol may suitably be triethylene glycol.

Component (C) may also suitably be a $C_1$ to $C_{20}$ monohydric alcohol, a $C_1$ to $C_{20}$ ketone, a $C_1$ to $C_{10}$ carboxylic acid ester or a $C_1$ to $C_{20}$ ether which may be aliphatic, alicyclic or aromatic. Examples are methanol, acetone, 2-ethyl hexanol, cyclohexanol, cyclohexanone, benzyl alcohol, ethyl acetate and acetophenone, preferably 2-ethyl hexanol. In the preferred method of producing the concentrate of the present invention, there may be used in combination (i) component (C) as defined above and (ii) a solvent.

As the solvent (ii) there may suitably be used an inert hydrocarbon, which may be aliphatic or aromatic. Examples of suitable solvents (ii) include toluene, xylene, naphtha and aliphatic paraffins, for example hexane, and cycloaliphatic paraffins.

A particularly preferred combination of (i) and (ii) is methanol and toluene. An advantage of using a combination of (i) and (ii) is that the use of ethylene glycol can be avoided. Residual ethylene glycol in the lubricating oil additive may result in corrosion of an engine in which the concentrate is used.

Component (D) is a lubricating oil. The lubricating oil is suitably an animal, vegetable or mineral oil. Suitably the lubricating oil is a petroleum-derived lubricating oil, such as a naphthenic base, paraffin base or mixed base oil. Solvent neutral oils are particularly suitable. Alternatively, the lubricating oil may be a synthetic lubricating oil. Suitable synthetic lubricating oils include synthetic ester lubricating oils, which oils include diesters such as di-octyl adipate, di-octyl sebacate and tri-decyladipate, or polymeric hydrocarbon lubricating oils, for example liquid polyisobutenes and poly-alpha olefins. The lubricating oil may suitably comprise from 10 to 90%, preferably from 10 to 70%, by weight of the concentrate. Component (D), a lubricating oil may be added to the initial reactants and/or at an intermediate point or points in the reaction.

Component (E) is carbon dioxide, which may be added in the form of a gas or a solid, preferably in the form of a gas. In gaseous form it may suitably be blown through the reaction mixture. We have found that generally the amount of carbon dioxide incorporated increases with increasing concentrations of component (F).

Suitably the carbon dioxide in a combined form may be present in the concentrate in an amount in the range from 5 to 20, preferably from 9 to 15% by weight based on the weight of the concentrate.

Component (F) is a carboxylic acid of formula (II), or an acid anhydride, an acid chloride or ester thereof. Preferably $R^3$ is an unbranched alkyl or alkenyl group. Preferred acids of formula (II) are those wherein $R^4$ is hydrogen and $R^3$ is a $C_{10}$ to $C_{24}$ unbranched alkyl group, more preferably a $C_{18}$ to $C_{24}$ unbranched alkyl group. Examples of suitable saturated carboxylic acids of formula (II) include capric, lauric, myristic, palmitic, stearic, isostearic, arachidic, behenic and ltgnoceric acids. Examples of suitable unsaturated acids of formula (II) include lauroleic, myristoleic, palmitoleic, oleic, gadoleic, erucic, ricinoleic, linoleic and linolenic acids. Mixtures of acids may also be employed, for example rape top fatty acids. Particularly suitable mixtures of acids are those commercial Erades containing a range of acids, including both saturated and unsaturated acids. Such mixtures may be obtained synthetically or may be derived from natural products, for example tall, cotton, ground nut, coconut, linseed, palm kernel, olive, corn, palm, castor, soyabean, sunflower, herring and sardine oils and tallow. Sulphurised acids and acid mixtures may also be employed. Instead of, or in addition to, the carboxylic acid there may be used the acid anhydride, the acid chloride or the ester derivatives of the acid, preferably the acid anhydride. It is preferred however to use a carboxylic acid or a mixture of carboxylic acids. A preferred carboxylic acid of formula (II) is stearic acid.

Suitably the concentrate may have a viscosity measured at 100° C. of less than 1000 cSt, preferably less than 750 cSt, more preferably less than 500 cSt.

The amount of component (F) required to provide from 2 to 40% by weight based on the weight of the concentrate will be to a first approximation the amount desired in the concentrate. In calculating this amount allowance should be made for loss of water from carboxylic acids, for example.

The reaction is carried out in the presence of component (G). As component (G) there may be used (G)(i) an inorganic halide which may suitably be either a hydrogen, an ammonium or a metal halide. Suitably the metal moiety of the metal halide may be zinc, aluminium or an alkaline earth metal, preferably calcium. Of the halides, the chloride is preferred. Suitable chlorides include hydrogen chloride, calcium chloride, ammonium chloride, aluminium chloride and zinc chloride, preferably calcium chloride.

Alternatively, component (G) may be (ii) an ammonium alkanoate or a mono-, di-, tri- or tetra-alkyl ammonium formate or alkanoate, preferably an ammonium alkanoate, more preferably ammonium acetate.

Mixtures of (i) and (ii) may be used as component (G). However, when component (G) is (ii) above, component (F) is not an acid chloride.

Suitably the amount of component (G) employed may be up to 2.0% by weight based on the weight of the concentrate.

Typically, the amount of component (F) incorporated is 10% to 35%, more preferably 12 to 20%, for example about 16% by weight based on the weight of the concentrate.

Suitably the amount of total alkaline earth metal present in the concentrate is 10 to 20% by weight based on the weight of the concentrate.

Preferably the TBN of the concentrate is greater than 350, more preferably greater than 400.

Suitably the reaction of components (A)–(G) may be carried out from 15 to 200, though the actual temperatures chosen for various stages of the reaction may differ if desired. The pressure may be atmospheric, subatmospheric or superatmospheric.

The concentrate may be recovered by conventional means, for example by distillative stripping of component (C), or the solvent (if any).

Finally, it is preferred to filter the concentrate so-obtained. Generally, the process of the invention will produce a concentrate having an acceptable viscosity, that is a viscosity of less than 1000 cSt at 100° C., and can produce concentrates having a viscosity less than 750 or 500 cSt at 100° C. Such viscometric properties are advantageous because they facilitate processing (including filtration) of the concentrate. However, it is also possible to produce concentrates having a higher viscosity than 1000 cSt at 100° C., generally at higher TBN levels. Filtration of such concentrates presents a problem, which may be overcome by adding a diluent prior to filtration and stripping the diluent off after filtration. Alternatively, high viscosity concentrates, for example concentrates having a viscosity at 100° C. of greater than 1000 cSt, and also having a high TBN, for example greater than 350, may be diluted by addition of further lubricating oil whilst maintaining a TBN greater than 300, thereby facilitating filtration.

Alternatively, the concentrate can be centrifuged in the presence of a diluent.

A final aspect of the present invention provides a finished lubricating oil composition which composition comprises a lubricating oil and lubricating oil additive concentrate prepared as herein before described.

Preferably the finished lubricating oil composition contains sufficient of the additive concentrate to provide a TBN of from 0.5 to 120.

The amount of additive concentrate present in the finished lubricating oil will depend on the nature of the final use. Thus, for marine lubricating oils the amount of additive concentrate present may suitably be sufficient to provide a TBN of 9 to 100 and for automobile engine lubricating oils the amount may suitably be sufficient to provide a TBN of 4 to 20.

The finished lubricating oil composition may also contain effective amounts of one or more other types of conventional lubricating oil additives, for example viscosity index improvers, anti-wear agents, antioxidants, dispersants, rust inhibitors, pour-point depressants, or the like, which may be incorporated into the finished lubricating oil composition either directly or through the intermediacy of the concentrate composition.

In addition to their use as additives for incorporation into lubricating oil compositions, the additive concentrates of the present invention may also find application as fuel additives.

The invention will now be further illustrated by reference to the following Examples. In all the Examples the term "TBN" (Total Base Number) is used. TBN is expressed in mg KOH/g as measured by the method of ASTM D2896. In the examples where lime is used, it is in the form of slaked lime $Ca(OH)_2$. The viscosities were measured by the method of ASTM D445.

EXAMPLE 1

| Charge | |
|---|---|
| ADX506 (Overbased calcium sulphonate, 300 TBN, = commercially available from Adibis). | 230 g |
| Stearic acid (95% pure) = | 63 g |
| Lubricating oil (SN 100) = | 26 g |
| Calcium chloride = | 3 g |
| 2-Ethylhexanol = | 190 g |

Method
(a) The mixture was heated to 120° C.,
(b) Lime (66 g) was added at 120° C./700 mm Hg,
(c) Ethylene glycol (32 g) was added at 145° C./700 mm Hg over 20 minutes,
(d) Carbon dioxide (66 g) was added at 145° C.,
(e) The mixture was stripped at 200° C./10 mm Hg for 60 minutes, and
(f) The product was filtered.
Product Weights
Crude Product = 373.6 g
Distillate = 249.9 g

| Product Composition After Filtration | |
|---|---|
| Calcium = | 14.2% w/w |
| Sulphur = | 1.1% w/w |
| Carbon Dioxide = | 14.7% w/w |
| TBN = | 393 mg KOH/g |
| $V_{100}$ = | 160 cSt |
| $V_{40}$ = | 1240 cSt |
| VI = | 249 |
| Stearic Acid = | 16.9% w/w |

EXAMPLE 2

| Charge | |
|---|---|
| ADX506 (Overbased calcium sulphonate, 300 TBN, = commercially available from Adibis). | 242.9 g |
| Stearic acid (70% pure) = | 61.6 g |
| Lubricating oil (SN 100) = | 25.4 g |
| Calcium chloride = | 2.2 g |
| 2-Ethylhexanol = | 39.1 g |
| Toluene = | 195.6 g |
| Methanol = | 19.6 g |

Method
(a) The mixture was heated to 60° C.,
(b) Lime (64.5 g) was added at 60° C./700 mm
(c) Carbon dioxide (64.5 g) was added at 60° C.,
(d) The mixture was stripped at 200° C./10 mm Hg over 60 minutes, and
(e) The product was filtered.
Product Weights
Crude Product = 368.4 g
Distillate = 280.5 g

| Product Composition After Filtration | |
|---|---|
| Calcium = | 15.3% w/w |
| Sulphur = | 1.2% w/w |
| Carbon Dioxide = | 16.0% w/w |
| Ca (as sulphonate) = | 0.37% v/w |
| TBN = | 423 mg KOH/g |
| $V_{100}$ = | 86.9 cSt |
| $V_{40}$ = | 678.7 cSt |
| VI = | 217 |
| Stearic Acid = | 16.7% w/w |

Comparison Test 1

| Charge | |
|---|---|
| ADX506 (Overbased calcium sulphonate, 300 TBN, = commercially available from Adibis). | 242.9 g |
| Lubricating oil (SN 100) = | 87.0 g |
| Calcium chloride = | 2.2 g |
| 2-Ethylhexanol = | 39.1 g |
| Toluene = | 195.6 g |

-continued

| Charge | |
|---|---|
| Methanol = | 19.6 g |

Method
(a) The mixture was heated to 60° C.,
(b) Lime (64.5 g) was added at 60° C./700 mmHg,
(c) Carbon dioxide (64.5 g) was added at 60° C.,
(d) The mixture was stripped at 200° C./10 mm Hg over 60 minutes, and
(e) The product was filtered.
Product Weights
Crude Product = 399.6 g
Distillate = 221.7 g

| Product Composition After Filtration | |
|---|---|
| Calcium = | 10.5% w/w |
| Sulphur = | 1.4% w/w |
| Carbon Dioxide = | 10.0% w/v |
| Ca (as sulphonate) = | 0.73% w/w |
| TBN = | 299 mg KOH/g |
| $V_{100}$ = | 14.7 cSt |
| $V_{40}$ = | 99.0 cst |
| VI = | 154 |
| Stearic Acid = | 0% |

It is concluded that in the absence of stearic acid no overall increase in TBN is observed.

EXAMPLE 3

| Charge | |
|---|---|
| ADX509 (Overbased calcium sulphonate, 400 TBN, = commercially available from Adibis). | 230.0 g |
| Stearic acid (70% pure) = | 63.0 g |
| Lubricating oil (SN 100) = | 26.0 g |
| Calcium chloride = | 3.0 g |
| 2-Ethylhexanol = | 40.0 g |
| Toluene = | 200.0 g |
| Methanol = | 20.0 g |

Method
(a) The mixture was heated to 60° C.,
(b) Lime (66.0 g) was added at 60° C./700 mm Hg,
(c) Carbon dioxide (66.0 g) was added at 60° C.,
(d) The mixture was stripped at 200° C./10 mm Hg over 60 minutes, and
(e) The product was filtered.
Product Weights
Crude Product = 399.2 g
Distillate = 201.8 g

| Product Composition After Filtration | |
|---|---|
| Calcium = | 17.1% w/w |
| Sulphur = | 0.82% w/w |
| Ca (as sulphonate) = | 0.48% w/w |
| TBN = | 443 mg KOH/g |
| $V_{100}$ = | 96.9 cSt |
| $V_{40}$ = | 990 cst |
| VI = | 189 |
| Stearic Acid = | 15.8% w/w |

Pin-on-Disc Friction Test Results

Comparison Test 2

The commercial overbased sulphonate (TBN=400) starting material for Example 3 was blended into a full marine cylinder lubricant formulation (70 TBN) and tested in the pin-on-disc friction test. The friction coefficient was 0.12.

EXAMPLE 4

Comparison Test 2 was repeated using the upgraded product of Example 3 (443 TBN). The friction coefficient was 0.08.

We claim:
1. A process for the production of a lubricating oil additive concentrate which process comprises reacting at elevated temperature
component (A) a calcium hydrocarbyl-substituted sulphonate,
component (B) a calcium base added either in a single addition or in a plurality of additions during the reaction,
component (C) at least one compound which is (i) a polyhydric alcohol having 2 to 4 carbon atoms, (ii) a di-($C_3$ or $C_4$) glycol, (iii) a tri-($C_2$-$C_4$) glycol, (iv) a mono-or polyalkylene glycol alkyl ether of the formula (I)

$$R(OR^1)_xOR^2 \qquad (I)$$

wherein R is a $C_1$ to $C_6$ alkyl group, $R^1$ is an alkylene group, $R^2$ is hydrogen or a $C_1$ to $C_6$ alkyl group and x is an integer from 1 to 6, (v) a $C_1$ to $C_{20}$ monohydric alcohol, (vi) a ketone having up to 20 carbon atoms, (vii) a carboxylic acid ester having up to 10 carbon atoms, or (viii) an ether having up to 20 carbon atoms,
component (D) a lubricating oil,
component (E) carbon dioxide added subsequent to the, or each, addition of component (B),
component (F) sufficient to provide from 10 to 35% by weight, based on the weight of the concentrate, of a carboxylic acid or an acid anhydride or ester thereof, said acid having the formula (II) and having a molecular weight of less than 500

$$R^3-\underset{\underset{R^4}{|}}{CH}-COOH \qquad (II)$$

wherein $R^3$ is a $C_{10}$ to $C_{24}$ alkyl or alkenyl group and $R^4$ is hydrogen or a $C_1$ to $C_4$ alkyl group, and
component (G) at least one compound which is an ammonium alkanoate or a mono-, di-, tri- or tetra-alkyl ammonium formate or alkanoate, so as to obtain a concentrate having a TBN greater than 300 and a viscosity at 100° C. of less than 750 cSt.
2. A process as claimed in claim 1 wherein said ammonium alkanoate is ammonium acetate.
3. A process as claimed in claim 1 wherein the process is carried out in the presence of a combination of component (C) as defined in claim 1 and an inert hydrocarbon selected from the group consisting of toluene, xylene naphtha, aliphatic paraffins, and cycloparaffins.
4. A process as claimed in claim 3 wherein component (C) is methanol and said hydrocarbon is toluene.
5. A process as claimed in claim 1 wherein component (B) is calcium hydroxide, component (C) is at least one compound chosen from the group consisting of ethylene glycol, methanol and 2 ethyl hexanol, component (F) is stearic acid, component (G) is ammonium acetate.
6. A process as claimed in claim 1 wherein the ratio of component (B) to component (A) is in the range from 0.2 to 50.

* * * * *

UNITED STATES PATENT AND TRADEMARK OFFICE
CERTIFICATE OF CORRECTION

PATENT NO.   : 5,384,053
DATED        : January 24, 1995
INVENTOR(S)  : CHARLES CANE, JOHN CRAWFORD and
               SEAN P. O'CONNOR It is certified that error appears in the above-indentified patent and that said Letters Patent is hereby corrected as shown below:

Col. 3, l. 19, correct the spelling of the word "alicyclic"

Col. 3, l. 47, correct the spelling of the word "polyisobutenes"

Col. 4, l. 4, correct the spelling of the word "lignoceric"

Col. 4, l. 10, correct the spelling of the word "grades"

Col. 6, Example 2, l. 39, should read "60°C/700 mm Hg,"

Signed and Sealed this

Twenty-fifth Day of April, 1995

Attest:

BRUCE LEHMAN

*Attesting Officer*    *Commissioner of Patents and Trademarks*